(No Model.)

R. A. LEIGH.
RUBBER TIRE.

No. 573,671.  Patented Dec. 22, 1896.

WITNESSES  
Francis C. Stanwood  
Thomas Cleary

INVENTOR  
Richard A. Leigh.  
by H. E. Lodge Atty.

United States Patent Office.

RICHARD A. LEIGH, OF BOSTON, MASSACHUSETTS, ASSIGNOR TO FREDERICK W. HUESTIS, OF SAME PLACE.

RUBBER TIRE.

SPECIFICATION forming part of Letters Patent No. 573,671, dated December 22, 1896.

Application filed February 7, 1896. Serial No. 578,326. (No model.)

*To all whom it may concern:*

Be it known that I, RICHARD A. LEIGH, a citizen of the United States, residing at Boston, in the county of Suffolk and State of Massachusetts, have invented certain new and useful Improvements in Rubber Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to rubber tires for vehicles; and it consists in improvements in the construction and arrangement of the parts whereby the elastic or cushion element is made fast to the tire or rim of the wheel without mechanical fastening devices.

My invention is embodied in the annular ring or band interposed between the tire and the cushion element or tread of the wheel. This "retaining-ring" or "fastener," so called, is to be employed in lieu of mechanical devices as heretofore practiced. This material is to be so compounded as to produce a hard inelastic substance when cool. By the application of heat the component parts of said fastener are softened and the ring is then elastic. When in this heated state and in a plastic condition, adhesion occurs between the tread or elastic part of the tire and the ring, the latter then being positioned about the tire. As before stated, when in a cool condition said fastening-ring becomes a tough hard inelastic substance and the tread or elastic portion adhering thereto cannot be detached from the rim and is held inseparable from the wood or metal composing the tire of the wheel by the rigidity of the fastening-ring, which now has become a firm inelastic substance fitting compactly to the tire.

Figure 1:
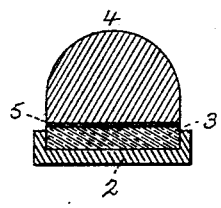
Figure 2:
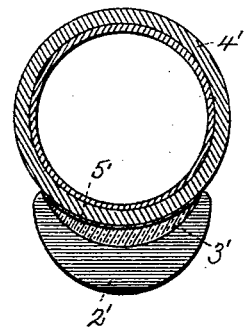

The drawings accompanying this specification represent, in Figure 1 in cross-section, a rubber tire embodying my invention applied to the wheel of a vehicle. Fig. 2 represents a similar view of a tire equipped with a pneumatic tread.

In said drawings, 2 represents the tire or rim proper, 3 the retaining-ring, and 4 the tread.

Reference to Fig. 1 shows the tire as channel-shaped in cross-section and adapted for a vehicle. Hence the tread 4 is preferably a solid ring of rubber or rubber composition, generally termed a "solid" tire. In order to secure this part of the tire to the metallic portion 2, I provide the fastening-band or retaining-ring, which is to be interposed between the rim and the tread. This rim or annular band is to consist of a hard cement-like substance susceptible to the effects of heat, whereby it becomes soft, and when in this condition is applied to the rim and properly positioned, as shown. Said ring is preferably composed of balata, shellac, asphalt, Burgundy pitch, and sulfur in such suitable proportions as will possess the property of being adapted for repetitive heating and cooling as often as may be desired and yet will retain the peculiarities of being elastic or yielding when hot and a tough inelastic body when cool. The sticky nature of the ingredients, one or more, causes adhesion to occur, and the ring when cooled is held fast in place, and, as before stated, becomes a hard tough inelastic cement-like body. Preferably a cover of canvas or analogous material is interposed between the retaining-band and the tread to prevent the rubber composing the tread from creeping on the hard surface of the retaining-ring.

It is to be understood that after the formation of the several coöperating parts of the tire separately, to wit, the rim or tire proper, the tread, and the retaining-ring, the canvas cover is applied to the fastening-ring. Subsequently the rubber tread, either solid cushion or pneumatic, is secured to the canvas, and the fastening-ring is then in readiness to be heated, after which act it is to be placed about the tire 2 and properly positioned. After a short lapse of time the fastening-ring becomes a tough hard cement-like substance and its removal is an impossibility, while the adhesion of the elastic tread to said ring prevents detachment of the said tread and the latter is held as firmly in place as if a wire or other fastening implement had been used.

In Fig. 2 a cross-section of a tire embodying my invention is shown as applied to the wheel of a bicycle, where the rim is at 2', the fastening ring or band at 3', and the pneumatic tube or tread at 4'. However, the relation and function of the several parts remain unchanged, the pneumatic tread being affixed to the retaining ring or band and the latter subsequently heated and then applied to the rim of the bicycle-wheel, which is preferably of wood.

What I claim is—

1. A fastening-ring for wheel-tires comprising a hard cement-like substance to be applied in a heated condition, whereby adhesion occurs between the wheel-rim and the ring, substantially as explained.

2. A wheel provided with an elastic tread, and a retaining-band interposed between the wheel-rim and the tread, said band to be positioned in a heated condition, when cool to consist of a hard inelastic body, whereby the rim and the tread are held inseparably united, substantially as specified.

3. A rubber tire comprising an elastic tread, a fastening-ring composed of a hard cement-like body, and a canvas band between the tread and the ring, the fastening-ring to be heated when applied to the wheel, substantially as stated.

4. A fastening-ring for wheel-tires composed of balata, shellac, asphalt, Burgundy pitch, and sulfur, said ring to be yielding or elastic, when heated, and a hard, inelastic body when cool, substantially as specified.

In testimony whereof I affix my signature in presence of two witnesses.

RICHARD A. LEIGH.

Witnesses:
   FREDERICK W. HUESTIS,
   H. E. LODGE.